United States Patent Office 3,366,581
Patented Jan. 30, 1968

3,366,581
5-HYDROXYTETRAZOLE AS BLOWING AGENT FOR THERMOPLASTIC RESINS
Ronald Arthur Reed, Quorn, Loughborough, England, assignor to Whiffen & Sons Limited, Loughborough, Leicestershire, England
No Drawing. Filed Oct. 2, 1964, Ser. No. 401,226
Claims priority, application Great Britain, Oct. 12, 1963, 40,343/63
6 Claims. (Cl. 260—2.5)

ABSTRACT OF THE DISCLOSURE

Cellular or foamed synthetic plastic products are prepared by incorporating in a thermoplastic material, 5-hydroxytetrazole, and heating the mixture to decompose the 5-hydroxytetrazole.

---

This invention is concerned with improvements in or relating to blowing agents.

The use of blowing agents in the manufacture of cellular or foamed synthetic plastic products is well established. A blowing agent is a chemical compound which decomposes on heating to a specific temperature, to yield a vapour or gas or mixture of vapour and gas. In use, the blowing agent is incorporated in the thermoplastic material at a temperature below the decomposition temperature of the blowing agent and the mixture subsequently heated to a temperature above the decomposition temperature of the blowing agent whereupon the blowing agent decomposes to liberate a gas or vapour which forms small voids within the thermoplastic material. It is, of course of importance that the blowing agent be finely and homogeneously dispersed within the thermoplastic material.

An important characteristic of a blowing agent is the temperature at which it decomposes to liberate gas or vapour since this temperature limits the temperature at which other operations may be performed on the thermoplastic material after incorporation of the blowing agent but before actual formation of the cellular product. It is, therefore, often of convenience to employ a blowing agent having a relatively high temperature of decomposition, this being especially the case when forming cellular products of thermoplastic material having relatively high fusion temperatures.

We have now found that 5-hydroxytetrazole is an excellent blowing agent which decomposes to yield nitrogen at temperatures above 237° C.

5-hydroxytetrazole has the formula:

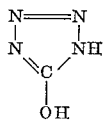

and may exist in the form of its tautomer, tetrazolone, of the formula:

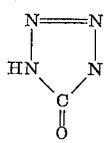

It will be understood that when reference is made to 5-hydroxytetrazole reference is also made to tetrazolone. 5-hydroxytetrazole is a known compound and may be prepared by a variety of routes. (Hattori, Lieber and Horwitz, J. Am. Chem. Soc., 1956, volume 78, page 411; Stolle, Ber., volume 62, page 1122 (1929); Inorganic Syntheses, volume 6, page 62 (1960).)

According to the invention, therefore, there is provided a process for the preparation of expanded resinous material which comprises incorporating 5-hydroxytetrazole into said resinous material at a temperature below the decomposition temperature of 5-hydroxytetrazole and subsequently heating the mixture to a temperature above the decomposition temperature of 5-hydroxytetrazole.

As pointed out above, the 5-hydroxytetrazole should be incorporated in the resinous material in a finely divided and homogeneous manner. This may conveniently be effected by tumbling the hydroxytetrazole, in powder form, with granules of the desired resinous material. Other methods of incorporation of blowing agents in resinous materials are known in the art and may be employed. Other agents, such as kickers, other blowing agents and diluents may also be used with the 5-hydroxytetrazole.

The relatively high decomposition temperature of 5-hydroxytetrazole renders it particularly suitable for use with thermoplastic material having relatively high fusion temperatures. Thus, for example, 5-hydroxytetrazole may be employed with polypropylene, high density polythene, nylon (polyamide), ABS (acrylonitrile-butadiene-styrene) resins and high temperature silicone rubbers.

The amount of 5-hydroxytetrazole employed depends to some extent upon the degree of "blowing" required. In general, however, amounts of less than 5% by weight, i.e. about 2%, based on the weight of resinous material, prove satisfactory. If the heating of the mixture is to be effected in an extruder, then the amount of 5-hydroxytetrazole may be less; e.g. less than 1% by weight or even less than 0.5% by weight.

The invention also comprises within its scope expandable compositions comprising a thermoplastic material for example one of those described above, together with 5-hydroxytetrazole.

In order that the invention may be well understood the following examples are given by way of illustration only.

Example 1

Granular polypropylene of a density of 0.905 (sold under the trade name "Carbona P") is tumble-mixed with 0.2% by weight of finely ground 5-hydroxytetrazole.

The mixture is extruded through a screw extruder having a ⅛ inch die. The extruder temperatures are: rear barrel 190° C.; front barrel 225° C.; head 240° C.; and die 230° C. The product has an excellent cell structure and densities as low as 0.63 are obtained depending upon the speed of extrusion.

Example 2

2% by weight of finely divided 5-hydroxytetrazole powder is intimately mixed with finely divided nylon 11, the two blending together well. This mixture is poured onto a tray to a depth of 0.15 inch and heated in an air oven at 240° C., for 5.25 minutes and then allowed to cool in the air. A tough rigid foam is produced having closed cells and a density of 0.22 g./a.

Example 3

2% by weight of 5-hydroxytetrazole is added to an ABS resin (sold under the trade name "Cyclac H") and whole is mixed on a two roll mill at 165–170° C. The smooth sheet is taken off the mill heated at 240° C. in an air oven, with gently circulating air, for 4–5 minutes. The sheet expanded from its original thickness of 0.039 inch to 0.102 inch, and expansion of 161%. The product has a tough rigid foam having a majority of closed cells and a density of 0.39 g./a.

I claim:
1. A process for the production of expanded resinous material which comprises incorporating 5-hydroxytetrazole into a thermoplastic polymeric resinous material at a temperature below the decomposition temperature of 5-hydroxytetrazole and subsequently heating the mixture to a temperature above the decomposition temperature of 5-hydroxytetrazole, said 5-hydroxytetrazole being employed at a level of less than 5% by weight, based on the weight of said resinous material.

2. A process for the production of expanded thermoplastic polymeric resinous material which comprises incorporating 5-hydroxytetrazole into a thermoplastic polymeric resinous material selected from the group consisting of polypropylene, high density polyethylene, polyamide, acrylonitrile-butadiene-styrene resins and high temperature silicone rubbers at a temperature below the decomposition temperature of 5-hydroxytetrazole, and subsequently heating the mixture to a temperature above the decomposition temperature of 5-hydroxytetrazole, said 5-hydroxytetrazole being employed at a level of less than 5% by weight, based on the weight of said resinous material.

3. An expandable resinous composition comprising thermoplastic polymeric resinous material having dispersed therein less than 5% by weight of 5-hydroxytetrazole based on the weight of said resinous material.

4. An expandable composition according to claim 3 also containing at least one member selected from the group consisting of blowing agents other than 5-hydroxytetrazole.

5. An expandable resinous composition comprising a thermoplastic polymeric resinous material selected from the group consisting of polypropylene, high density polyethylene, polyamide, acrylonitrile-butadiene-styrene resins and high temperature silicone rubbers, having dispersed therein less than 5% by weight of 5-hydroxytetrazole based on the weight of said resinous material.

6. A composition according to claim 5 also containing at least one member selected from the group consisting of blowing agents other than 5-hydroxytetrazole.

References Cited

UNITED STATES PATENTS 3,192,170  6/1965  Schmidt et al. _____ 260—2.5
3,235,519  2/1966  Hunter _____ 260—2.5

OTHER REFERENCES

Benson, Chemistry of the Tetrazoles, Chemical Reviews, August 1947, vol. 41, No. 1, pages 6 and 7 relied on.

MURRAY TILLMAN, *Primary Examiner.*

SAMUEL H. BLECH, *Examiner.*

J. T. GOOLKASIAN, *Assistant Examiner.*